(12) United States Patent
Park et al.

(10) Patent No.: US 9,696,870 B2
(45) Date of Patent: Jul. 4, 2017

(54) METHOD OF OPERATING A BACKGROUND CONTENT AND TERMINAL SUPPORTING THE SAME

(71) Applicant: Samsung Electronics Co., Ltd., Gyeonggi-do (KR)

(72) Inventors: Youngjoo Park, Gyeonggi-do (KR); Sehwan Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 13/662,649

(22) Filed: Oct. 29, 2012

(65) Prior Publication Data

US 2013/0106904 A1 May 2, 2013

(30) Foreign Application Priority Data

Oct. 28, 2011 (KR) .................. 10-2011-0111469

(51) Int. Cl.
| | | |
|---|---|---|
| *G09G 5/00* | (2006.01) | |
| *G06F 3/048* | (2013.01) | |
| *G06F 3/0481* | (2013.01) | |
| *G06F 3/0488* | (2013.01) | |
| *H04M 1/725* | (2006.01) | |
| *G06F 3/0484* | (2013.01) | |

(52) U.S. Cl.
CPC ...... *G06F 3/04817* (2013.01); *G06F 3/04842* (2013.01); *G06F 3/04883* (2013.01); *H04M 1/72544* (2013.01); *H04M 1/72583* (2013.01); *G06F 2203/04803* (2013.01); *G06F 2203/04808* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 5,598,523 | A * | 1/1997 | Fujita | 715/840 |
| 5,943,039 | A * | 8/1999 | Anderson | G06F 3/03545 345/902 |
| 7,030,890 | B1 * | 4/2006 | Jouet et al. | 345/619 |
| 7,793,222 | B2 * | 9/2010 | Chaudhri | G06F 3/0481 715/764 |
| 8,566,818 | B2 * | 10/2013 | Young et al. | 717/174 |
| 2006/0290658 | A1 * | 12/2006 | Konuma et al. | 345/156 |

(Continued)

FOREIGN PATENT DOCUMENTS

| | | |
|---|---|---|
| KR | 1020050023558 | 3/2005 |
| KR | 1020070031736 | 3/2007 |

(Continued)

*Primary Examiner* — Ryan R Yang
(74) *Attorney, Agent, or Firm* — The Farrell Law Firm, P.C.

(57) ABSTRACT

A method of outputting background content, which includes outputting a complex area by outputting a background content area in which a background content designated as a start content is output and outputting a function selection area to the background content area, the function selection area including items for selecting at least one specific function supported by a terminal, receiving an input signal for removing the function selection area, and outputting a background screen including only the background content area according to the received input signal for removing the function selection area.

18 Claims, 8 Drawing Sheets

(56) References Cited

U.S. PATENT DOCUMENTS

| | | | |
|---|---|---|---|
| 2007/0058047 A1* | 3/2007 | Henty | 348/211.99 |
| 2007/0261003 A1* | 11/2007 | Reissmueller | 715/810 |
| 2008/0037869 A1* | 2/2008 | Zhou | G06T 7/0081 |
| | | | 382/173 |
| 2009/0047940 A1* | 2/2009 | Lim | H04M 1/72544 |
| | | | 455/418 |
| 2009/0094562 A1 | 4/2009 | Jeong et al. | |
| 2010/0251152 A1* | 9/2010 | Cho et al. | 715/765 |
| 2010/0295789 A1* | 11/2010 | Shin | G06F 1/1626 |
| | | | 345/168 |
| 2011/0032424 A1* | 2/2011 | VanDuyn et al. | 348/553 |
| 2011/0084986 A1 | 4/2011 | Kim | |
| 2011/0138334 A1* | 6/2011 | Jung | 715/841 |
| 2011/0145764 A1* | 6/2011 | Higuchi et al. | 715/835 |

FOREIGN PATENT DOCUMENTS

| | | |
|---|---|---|
| KR | 1020100104562 | 9/2010 |
| KR | 1020110040110 | 4/2011 |

\* cited by examiner

METHOD OF OPERATING A BACKGROUND CONTENT AND TERMINAL SUPPORTING THE SAME

PRIORITY

This application claims priority under 35 U.S.C. §119(a) to a Korean patent application filed on Oct. 28, 2011 in the Korean Intellectual Property Office and assigned Serial No. 10-2011-0111469, the entire disclosure of which is incorporated herein by reference.

BACKGROUND OF THE INVENTION

1. Field of the Invention

The present invention relates generally to a background content of a terminal, and more specifically, to a method of operating background content and a terminal supporting the same in which a background content area provided as default to a terminal may be actively controlled.

2. Description of the Related Art

A portable terminal supports call functionality and is used in various ways due to its convenience of use and ease of portability. The portable terminal provides various input methods to provide user functionality. For example, a conventional portable terminal provides a touch screen including a touch panel and a display unit such that a user's operation performed to select a specific image outputted to the display unit is processed on the touch panel. Also, the portable terminal generates a touch event according to a corresponding user's operation and controls an application program corresponding to a user function based on the generated touch event.

Also, the conventional portable terminal is constructed to provide a large size screen in order to support various user functionality. Accordingly, a user places icons or images for operating various user functions on the large size screen and uses a specific user function by selecting a corresponding icon or image to execute the associated user function.

Additionally, the conventional portable terminal provides a background screen function. Accordingly, the user places various content such as a specific picture, image or avatar on a background screen and views the various content. However, in an environment in which the large size screen is supported, a background screen operating function is rather degraded. That is, in a recently developed portable terminal, in order to enable prompt selection and operation of the user function, an icon or image for selecting the user function described above is placed on an upper layer of the background screen, and thus, an image of the background screen is covered by such icon or image. Namely, in operating the portable terminal, a technology that allows faster and easier operation of a user's function of convenience rather causes difficulty to display a picture or image that is placed on the background screen for user's viewing.

In addition, in the conventional mobile terminal, in order for the user to replace a picture or image disposed on the background screen with another picture or image, the user must select a specially prepared menu to select various low sub-categories. Accordingly, there exists inconvenience in changing the background screen. Consequently, in order to avoid the above-described inconvenience, the general practice is to not replace a picture or image of the background screen. Accordingly, a benefit of the background screen, in which a picture or image desired and needed by the user is visible and viewable, is not often utilized, such that the background screen is degenerated into a useless feature.

SUMMARY OF THE INVENTION

Accordingly, the present invention has been made in view of the above problems and/or disadvantages, and provides a method of operating a background content and a terminal supporting the same in which various content desired by a user is easily viewed in a background screen while maintaining a technology for prompt operation of a user function.

According to an aspect of the present invention, a method of outputting background content includes a complex area by outputting a background content area in which a background content designated as a start content is outputted and outputting a function selection area to the background content area, the function selection area including items for selecting at least one specific function supported by a terminal, receiving an input signal for removing the function selection area, and outputting a background screen comprising only the background content area according to the received input signal for removing the function selection area.

According to another aspect of the present invention, a method of outputting background content includes a complex area by outputting a background content area in which a background content designated as a start content is outputted and outputting a function selection area to the background content area, the function selection area including items for selecting at least one specific function supported by a terminal, receiving at least one of a long touch event, a tap touch event, a flick or a drag touch event for removing the function selection area generated in an area other than at least one icon area that is disposed on the function selection area, and outputting a background screen comprising only the background content area according to the received touch event.

According to another aspect of the present invention, a terminal for supporting background content output includes a touch screen configured to display a complex area including a background content area in which a screen element corresponding to a background content designated as a start screen is outputted and a function selection area in which a screen element corresponding to items for selecting a specific function supported by the terminal is outputted on the background content area, at least one of an input unit and the touch screen configured to generate an input signal for removing the function selection area, and a controller configured to control to output the background screen comprising only the background content area to the touch screen according to the received input signal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Various embodiments of the present invention are described in detail with reference to the accompanying drawings. The same or like reference numbers are used throughout the drawings to refer to the same or like elements. Detailed description of well-known functions and structures is omitted to avoid obscuring the subject matter of the present invention.

Figure 1:
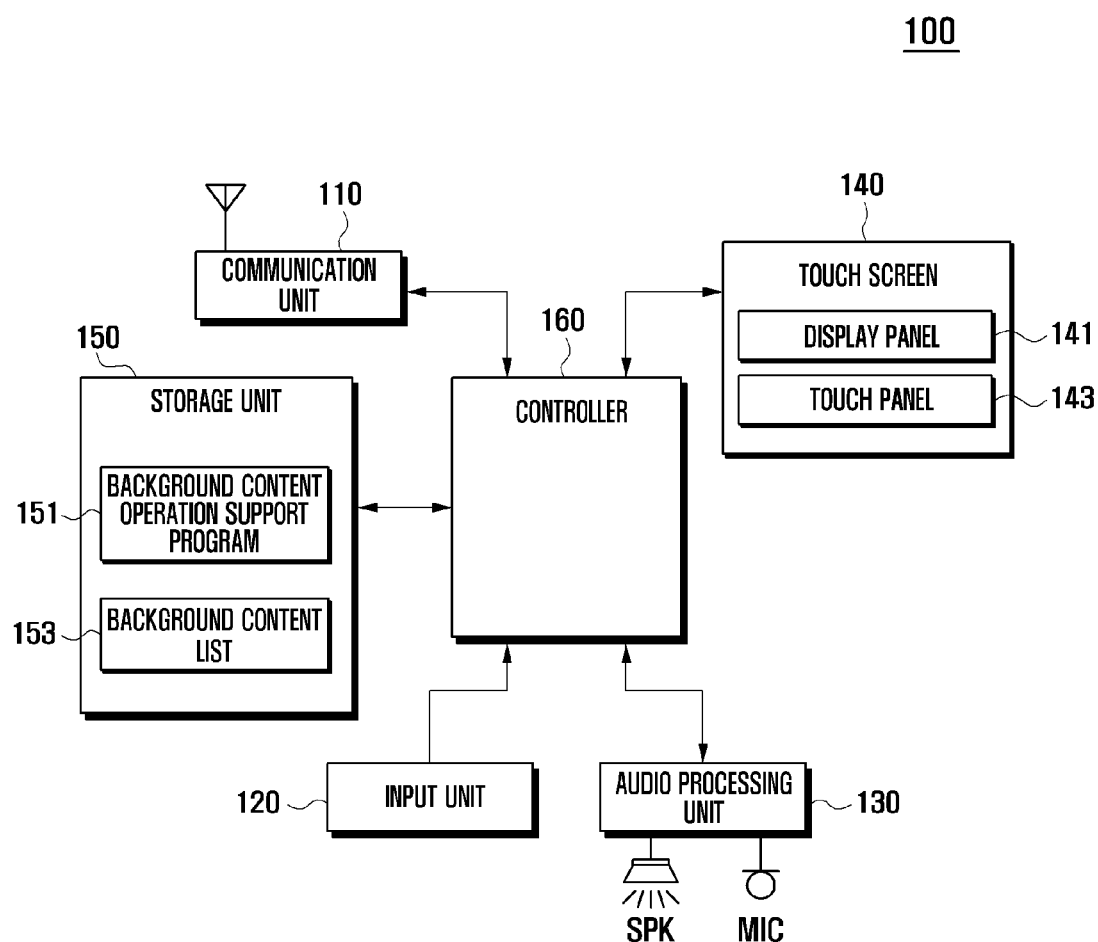
FIG. 1 is a block diagram illustrating a terminal according to an embodiment of the present invention.

FIG. 1 is a block diagram illustrating a terminal that supports a background content operating function according to an embodiment of the present invention.

Referring to FIG. 1, a terminal 100 of the present invention includes a communication unit 110, an input unit 120, an audio processing unit 130, a touch screen 140, a storage unit 150, and a controller 160.

The terminal 100 supports to selectively remove a function selection area from a start screen, which is configured as a complex area including a screen element output to the function selection area after booting of the terminal 100 is completed and a screen element output to a background content area. Accordingly, the terminal 100 supports to allow only background content to be viewed. The terminal 100, according to the user's request, easily returns to the start screen in which the function selection area is output, thereby being capable of maintaining promptness and convenience in operating a user function. Hereinafter, each element of the terminal 100 will be described in detail with respect to its role and function in operating the background content according to the present invention.

First, the communication unit 110, under control of the controller 160, forms a communication channel for a voice call and a communication channel for a video call, and a communication channel for transmitting a data such as an image or a message. That is, the communication unit 110 forms a voice call channel, a data communication channel, and a video call channel between mobile communication systems. The communication unit 110 includes a radio frequency transmission unit for performing frequency up conversion and amplification of a signal to be transmitted and a radio frequency receiving unit for performing low noise amplification and frequency down conversion of a received signal. Specifically, the communication unit 110 receives data corresponding to the background content from an external such as, for example, other terminal or a web server, and a received background content is transmitted to the controller 160 to be stored in an area of the storage unit 150 according to the control of the controller 160.

The background content includes content in various forms according to various user preferences such as, for example, a picture, a still image, a video, a slide image, an avatar, a text, or a family motto. The background content is defined as being stored in the background content storage unit 150 and output to the background content area of the start screen according to the control of the controller 160. Alternatively, the background content is a content received by the user from a specific web server in real time, at a predetermined interval, or upon a certain event occurring. The content received in real time or received at a predetermined interval includes text information such as news, and real time image information of a specific area that is updated at a predetermined interval or a blog that is updated at a period in which an event occurs. The user designates various content desired by the user as at least one background content, thereby outputting the various content as the start screen during a process of driving the terminal 100. Accordingly, the user easily recognizes an update of a content that changes continuously or intermittently through the start screen and views only a photograph or image during a time period desired by the user without the function selection area blocking the specific photograph or image.

When the background content is content that changes in real time, at a predetermined interval, or in a period in which an event occurs, as described above, the communication unit 110 forms a communication channel for collecting a corresponding content by accessing a network, which can collect the corresponding content, upon an event occurring, in real time, or at a predetermined interval. Also, the communication unit 110 receives background content update information to be transmitted to the controller 160, based on the formed communication channel.

The input unit 120 includes a plurality of input keys and function keys for receiving numeral or character information and setting various functions. The function keys includes, for example, an arrow key, a side key, and a shortcut key that are set to perform a specific function. Also, the input unit 120 generates a key signal associated with user setting and a function control of the terminal 100 and transmits the key signal to the controller 160. When a display unit of the terminal 100 is formed as the touch screen 140, the input unit 120 is implemented as, for example, a QWERTY key map, a DVORAK key map, a 3*4 key map, or a 4*3 key map, which includes a plurality of keys outputted to the touch screen 140. That is, the input unit 120 is replaced by an input function of the touch screen 140. Specifically, the input unit 120 provides an input button that can generate an input signal, for example, a home key input signal for outputting the start screen comprising the function selection area and the background content area and a turn-on signal of the terminal 100.

Hereinafter, the present invention will be described with respect to performing a function according to a touch operation for a background content area search, the background content area search is supported through the input unit 120. That is, the input unit 120 is provided with, for example, a specific key button or a hot key to generate, according to activation of a corresponding key, an input signal for outputting the background screen comprising only the background content or an input signal for searching for other background content on the background screen comprising only the background content.

Additionally, the input unit 120 generates an input signal for configuring a background content list to be outputted to the background content area. For example, when using a plurality of pictures as the background content, the user designates only a specific picture among the plurality of pictures as an item of the background content list, and in this case, the input unit 120 generates an input signal according to a corresponding user's request and transmit the generated input signal to the controller 160.

The audio processing unit 130 includes a speaker SPK for outputting, for example, an audio data transmitted and received during a call, an audio data included in a message, and an audio data stored in the storage unit 150 and includes a mike MIC for collecting a user's voice or various audio signals during the call. The audio processing unit 130 supports an output of various audio data required for performing a background content operating function of the present invention. For example, the audio processing unit 130 supports an output of an audio data associated with designating the background content or completing receipt of the background content during a process of downloading the background content from an external. Also, when specific background content is associated with a specific audio file and an input signal for searching for corresponding background content is generated, the audio processing unit 130 supports an output of an audio data According to reproducing of the associated audio file. The specific background content is at least one of a still image, a video, an avatar, or a slide image. Also, when the background content changes in real time, at a predetermined interval, or upon an event occurring, as described above, the audio processing unit 130 supports to output a corresponding alarm, i.e., an alarm or announcement that notifies the change. A function of the audio processing unit 130 of outputting the announcement, the alarm, or a sound effect described above is omitted according to user setting.

The touch screen 140 includes a display panel 141 and a touch panel 143. The touch screen 140 includes a structure in which the touch panel 143 is disposed on an entire surface of the display panel 141.

The display panel 141 displays various menus of the terminal 100 as well as information inputted by the user or information provided to the user. Namely, the display panel 141 provides various screens according to use of the terminal 100 such as, for example, a standby screen, a message writing screen, or a call screen. The display panel 141 is implemented as a Liquid Crystal Display (LCD) or an Organic Light Emitted Diode (OLED). Also, the display panel 141 is disposed on an upper portion or a lower portion of the touch panel.

Specifically, the display panel 141 of the present invention outputs the start screen including the function selection area and the background content area. Also, the display panel 141 supports to change a screen according to a change to the start screen in response to an input signal generated from, for example, the touch panel 143 or the input unit 120. That is, when an input signal for removing the function selection area is generated from the start screen, the display panel 141 configures a screen only by the background content area. A background content screen configured only with the background content area outputs not only a specific background content screen preset by the user but also various background content registered in the background content list. Here, an output of the various background content is performed by changing the background content according to an input signal generated from the touch panel 143 or the input unit 120 and the various background content that are automatically registered in the background content list according to pre-setting is changed to be outputted. The start screen outputted through the display panel 141 will be described in detail with reference to a screen interface described below.

The touch panel 143 is positioned on at least one of upper and lower portions of the display panel 141, generates a touch event according to a touch by an object, for example, a user's finger, and transmits the generated touch event to the controller 160. Here, a sensor which configures the touch panel 143 is arranged in a matrix form, and regarding a touch event generated on the touch panel 143, information of a corresponding location and information of a type of the touch event is transmitted to the controller 160. Specifically, according to a user's operation control, the touch panel 143 generates a touch event corresponding to, for example, an input signal for removing the function selection area when the start screen is being outputted, an input signal for recalling the removed function selection area, and an input signal for searching for a plurality of background content in the start screen comprising only the background content area. The generated touch event is transmitted to the controller 160 to be treated as a command According to a corresponding input signal.

The storage unit 150 stores an application program required for operating a function according to an embodiment of the present invention as well as a key map or a menu map for operating the touch screen 140. The key map and the menu map includes various forms. The storage unit 150 includes a program area and a data area.

In the program area, an operating system (OS) for booting the terminal 100 and operating the above described elements, an application program for supporting various user functions of the terminal 100 such as, for example, an application program for reproducing various files, an application program for supporting a call function of the terminal 100, a web browser for connecting to an internet server, an MP3 application program for reproducing various sound sources, an image outputting application program for searching, for example, a picture, or a video reproducing application program. Specifically, a background content operation support program 151 is stored in the program area of the present invention.

The background content operation support program 151 includes a routine for detecting an input signal for removing the function selection area among input signals generated in the start screen, a background content output routine for supporting to output the start screen comprising only the background content area when a corresponding input signal is generated, and a routine for supporting to recall the removed function selection area to be outputted. The background content output routine includes a routine for identifying the background content list 153, a routine for searching for the background content designated as a start content in the background content list 153 when outputting the start screen, and a routine for supporting to output the searched start content to a lower portion of the function selection area. Also, the background content output routine includes a routine for supporting to output other background content registered in the background content list 153 to the display panel 141 according to a corresponding input signal when an input signal for searching for the background content is generated while the background content is being outputted.

Also, the background content operation support program 151 includes a list configuring support routine for supporting to configure the background content list 153. That is, when a specific content is designated as the background content, the background content operation support program 151 includes a routine for newly registering the specific content to the background content list 153 and a routine for removing a specific item from the background content list 153 among items registered in the background content list 153 according to the user's request. Additionally, the background content operation support program 151 includes a routine for controlling the communication unit 110 for receiving corresponding content update information when the background content is operated based on the update information as described above and a routine for supporting to update the background content based on the received background content update information and to output the updated background content to the display panel 141.

The data area is an area in which a data produced according to the use of the terminal 100 is stored and at least one icon according to a phone book data and a widget function as well as various content is stored in the data area. In addition, a user input received through the touch panel 143 is stored in the data area. Specifically, the data area supports a function to temporarily store the background content list 153 and the background content update information for supporting the updated background content when receiving the background content update information. With respect to the background content having an update function, entire update information thereof is stored in the data area or update information of a most recently updated background content is stored for the sake of efficiency of the storage unit 150.

The controller 160 controls power supply to each element of the terminal 100 to support to perform an initialization process. The controller 160 controls various signal flows for supporting a background content operation function of the terminal 100. The controller 160 includes a configuration shown in FIG. 2.

Figure 2:
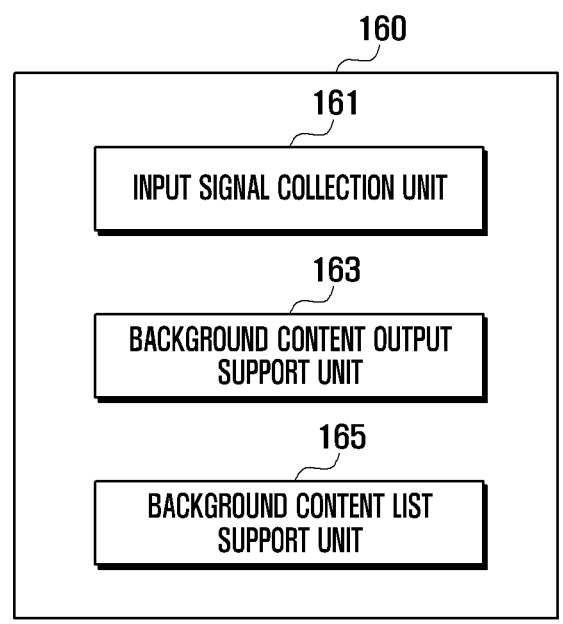
FIG. 2 is a diagram illustrating a configuration of a controller of FIG. 1.

FIG. 2 is a diagram illustrating in detail a configuration of the controller 160 according to an embodiment of the present invention.

Referring to FIG. 2, the controller 160 of the present invention includes an input signal collection unit 161, a background content output support unit 163, and a background content list support unit 165.

The input signal collection unit 161 is configured to determine whether an input signal for activating a background content search function of the present invention is collected from at least one of the input unit 120 and the touch screen 140. Also, when the input signal for the background content search function is generated, the input signal collection unit 161 transmits a corresponding input signal to the background content output support unit 163. Also, the input signal collection unit 161 collects an input signal associated with setting the background content and setting the background content list 153 of the present invention. For example, when an input signal for removing specific background content included in the background content list 153 from a corresponding list is collected, the input signal collection unit 161 transmits a corresponding input signal to the background content list support unit 165. Also, when an input signal for designating a specific content as the background content is collected, the input signal collection unit 161 transmits a corresponding input signal to the background content list support unit 165. Also, when the background content screen comprising only the background content area is outputted and an input signal for searching for a specific other background content is generated, the input signal collection unit 161 transmits a corresponding input signal to the background content output support unit 163.

The background content output support unit 163 supports an output of the start screen comprising the function selection area and the background content area and an output of the background screen comprising only the background content area. Also, the background content output support unit 163 supports an output of a screen that supports searching for other background content according to an input signal transmitted by the input signal collection unit 161 and an output of a screen that supports updating the background content that is to be disposed on the start screen. More specifically, the background content output support unit 163 identifies a situation in which the start screen of the terminal 100 is outputted such as, for example, the start screen is outputted according to a set schedule after a booting process is completed or according to a home key being pressed or according to completing a specific user function. Then, the background content output support unit 163 identifies the background content set to be outputted to the start screen among background content stored in the storage unit 150 and supports to output a corresponding background content to the display panel 141. Additionally, the background content output support unit 163 supports to output the function selection area to the background content area in which the background content is outputted. The function selection area includes, for example, a menu selection screen comprising a plurality of menu icons or a widget selection screen comprising a plurality of widget icons.

Also, when the input signal for removing the function selection area is generated, the background content output support unit 163 supports an output of the background content screen comprising only the background content area. Next, the background content output support unit 163 supports to output other background content to the display panel 141 according to an input signal additionally inputted in the background content screen or according to a predefined method. During this process, the background content output support unit 163 supports to output various background content in the background content screen according to a slide method in which the background content is changed at a predetermined time interval.

When the background content outputted to the background content screen is a content that is updated according to the update information, the background content output support unit 163 controls to receive the background content update information, at least one of, at a predetermined interval, in real time, or upon an event occurring. Also, the background content output support unit 163 controls to update the background content currently outputted to the display panel 141 by using the received background content update information. A function of updating the background content applies to the background content area even when the function selection area is outputted to the background content area. Accordingly, the user identifies an update of the background content even when the function selection area is outputted to the background content area and removes the function selection area to perform a background content search.

Also, when a specific input signal for recalling the function selection area is generated in a state where the background screen comprising only the background content area is being outputted, the background content output support unit 163 recalls the function selection area to configure the start screen. The background content output support unit 163 recalls the function selection area on the background content that is currently displayed to configure the start screen. Therefore, in a situation in which the user searches for other background content that is different from the background content previously outputted and recall the function selection area, a new start screen that is different from a previous screen is configured. The start screen configured in this manner is maintained to be provided in a subsequent situation where the start screen needs to be outputted.

The background content list support unit 165 supports a function to register a specific content in the background content list 153, remove a registered item, or set the start screen. That is, when an input signal for designating the specific content as the background content according to the user's request is generated, the background content list support unit 165 controls to register a corresponding specific content to the background content list 153. Next, the background content list support unit 165 provides the background content list 153 to the background content output support unit 163 during a background content search process. Also, the background content list support unit 165 supports to remove the specific background content from the list during the background content search process. Further, the background content list support unit 165 supports a function such as, for example, providing a screen for searching the background content list 153, removing a specific background content from the background content list 153 through a corresponding screen, or designating the specific background content as a background content to be used in the start screen.

With reference to FIGS. 3 through 6, various screen interfaces associated with operating the background content described the above will be described in detail.

Figure 3:
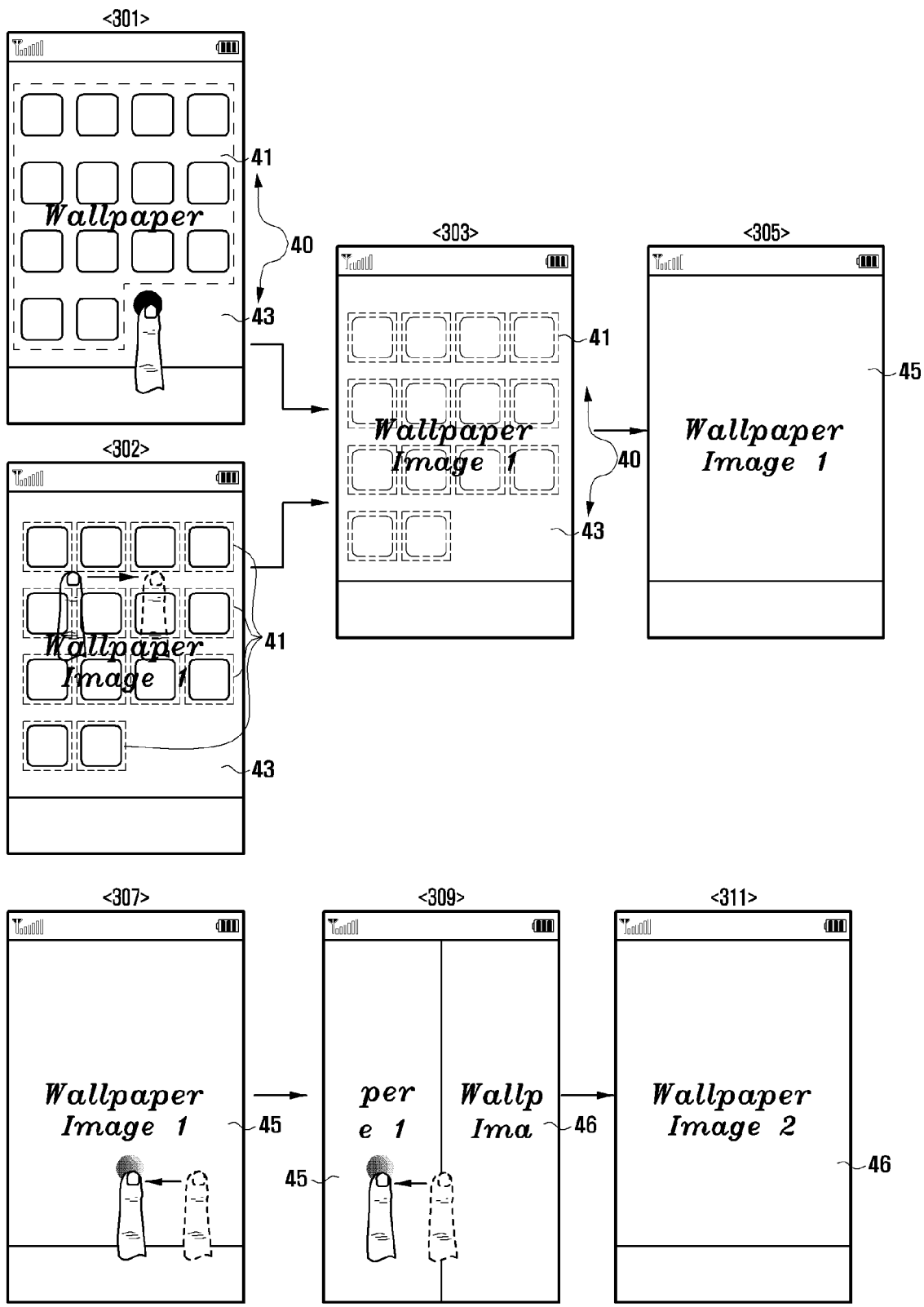
FIG. 3 is a diagram illustrating a user interface associated with a background content search function according to an embodiment of the present invention.

FIG. 3 is a diagram illustrating a user interface for searching background content in a background content operating function according to an embodiment of the present invention.

Referring to FIG. 3, the user requests the start screen including the function selection area and the background content area in a process of operating the terminal 100, and accordingly, as shown in a screen 301, the terminal 100 outputs a first start screen 40 including a function selection area 41 and a first background content area 43 According to an output of a first background content to the display panel 141. For example, during operating the terminal 100, the user activates a home key, change the terminal 100 in a turn off state to a turn-on state to complete booting, or generate an input signal instructing to complete a corresponding user function when a specific user function is being performed with the first start screen 40 being outputted. Then the controller 160 of the terminal 100 outputs the start screen according to preset schedule information, wherein the first start screen 40 in which the function selection area 41 is disposed on the first background content area 43 is outputted as illustrated in FIG. 3. The controller 160 identifies the background content list 153 to identify the background content set as the start content, i.e., the first background content to control to output the first background content to the first background content area 43 of the first start screen 40.

The user instructs the terminal 100 to search the background content instead of selecting a specific menu or widget of the function selection area 41 while the first start screen 40 is being outputted. For example, the user generates a predefined touch event in a predetermined area of the screen 301 in which the function selection area 41 is not disposed. When the predefined touch event such as, for example, a long touch event generated on the first background content area 43 or a specific gesture event generated in a specific area including at least one tap event, a flick or a drag, for outputting the background screen comprising only the first background content area 43 is generated from the touch panel 143, the terminal 100 supports to output a first background screen 45 comprising only the first background content area 43 to the display panel 141, as shown in a screen 305 via a screen 303. The screen 303 illustrates an example in which the function selection area 41 is faded out in a background screen output process, however, alternatively, the function selection area 41 is removed from the screen 303 in various manners such as, for example, as being pushed to the left and right, i.e., toward an edge portion. Here, an input signal for outputting the background screen comprising only the first background content area 43 includes not only the above described touch event but also an input signal from the specific key button or the hot key of the input unit 120 mentioned above.

Accordingly, the user views in the screen 305 only the first background screen 45 in which only the first background area 43 is displayed by removing the function selection area 41. Accordingly, when the user designates a specific content such as, for example, a picture or an image preferred by the user as the background content to be disposed on a screen, a corresponding background content fully viewed by the user without being blocked by the function selection area 41.

The function selection area 41 includes icon areas arranged in a matrix, as shown in screen 302. Thus, an area in which icons are not disposed includes the background content area. In the above description, an icon is arranged in a matrix form, however, alternatively, the area in which the icons are disposed is divided by icons disposed horizontally and a touch operation for calling the background content area is performed in an area in which icons are not outputted in a horizontal direction. Also, when the area in which the icons are disposed is divided by icons disposed in a vertical direction, the user performs a touch operation for calling the background content area in an area between icon areas arranged in a vertical direction. That is, it should be noted that the icon area of the present invention can be arranged in various ways according to how the icon is arranged to be output, and accordingly, when the touch operation is applied to call the background content area, a corresponding touch operation includes a touch operation performed in a specific area in which the icons are not outputted.

Consequently, the user performs an operation for generating a specific event for calling the background screen comprising only the first background content area 43 in an area in which icons corresponding to the function selection area 41 are not outputted. Accordingly, when the above mentioned predefined touch event is generated in an area other than the icons comprising the function selection area 41, the controller 160 controls to output the background screen comprising only the background content area.

Figure 6:
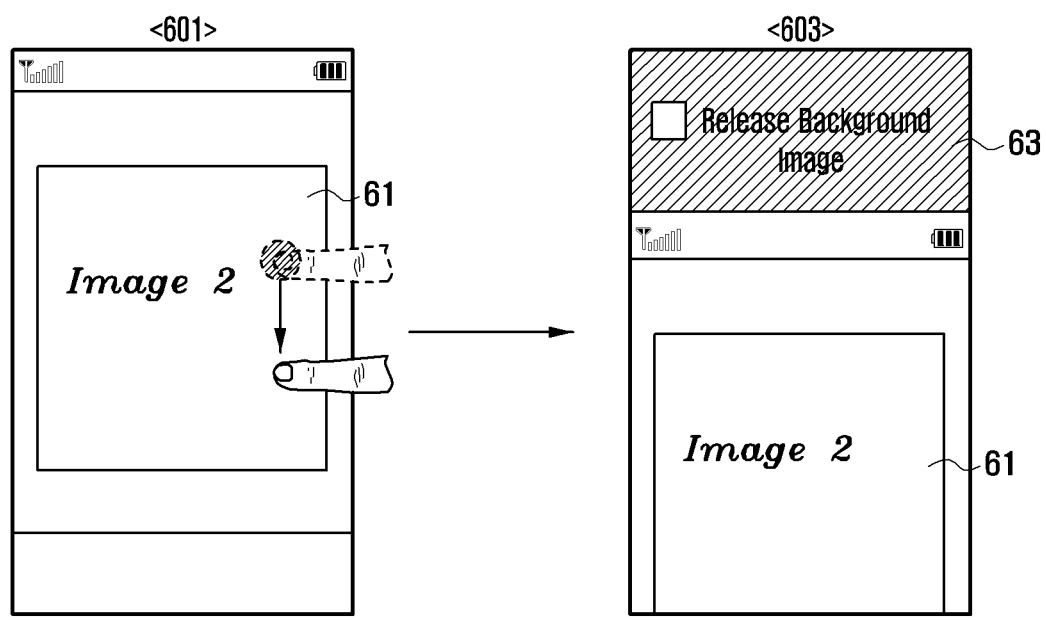
FIG. 6 is a diagram illustrating an example screen illustrating cancellation of a background content of the present invention.

When the user requests to search for other background content, the user performs to generate an input signal for searching for a second background content on the touch screen 140 in which the first background screen 45 is outputted, as shown in a screen 307. For example, the user performs an operation for generating a flick event or a drag event in a left direction on the first background screen 45. Then the touch screen 140 outputs a second background screen 46 comprising the second background content that is different from the first background content that is previously outputted, as shown in a screen 311 via a screen 309. The screen 309, which is shown to explain a switch from the first background screen 45 to the second background screen 46, can be omitted. In FIG. 6, the first background screen 45 is moved in the left direction to be removed while the second background screen 46 is moved from the right to the left to be outputted. Through the above-described method, the user searches for various additional background content or return to the first background screen 45 comprising the first background content.

When an input signal for searching for the background content is generated in the screen 307, the controller 160 of the terminal 100 identifies the background content list 153 stored in the storage unit 150. Also, the controller 160 supports to output other background content registered in the background content list 153 along with the second background screen 46. The background content list 153 includes information about a search order between background content and the controller 160 determines the background content to be outputted to the second background screen 46 according to a corresponding search order and the generated input signal.

In the above description, only the background content such as, for example, an image or a text outputted to the touch screen 140 is described, however, alternatively, an audio file is reproduced in case of a specific background content. Namely, in a process of registering a specific content to the background content list 153 as the background content, if the specific content is registered as the background content in association with a specific audio file and a corresponding background content is outputted as the background screen, the controller 160 controls to search and reproduce the associated audio file as well as outputting the corresponding background content to the touch screen 140. Accordingly, the user listens to a reproduced data of the specific audio file as well as searching for the background content.

Figure 4:
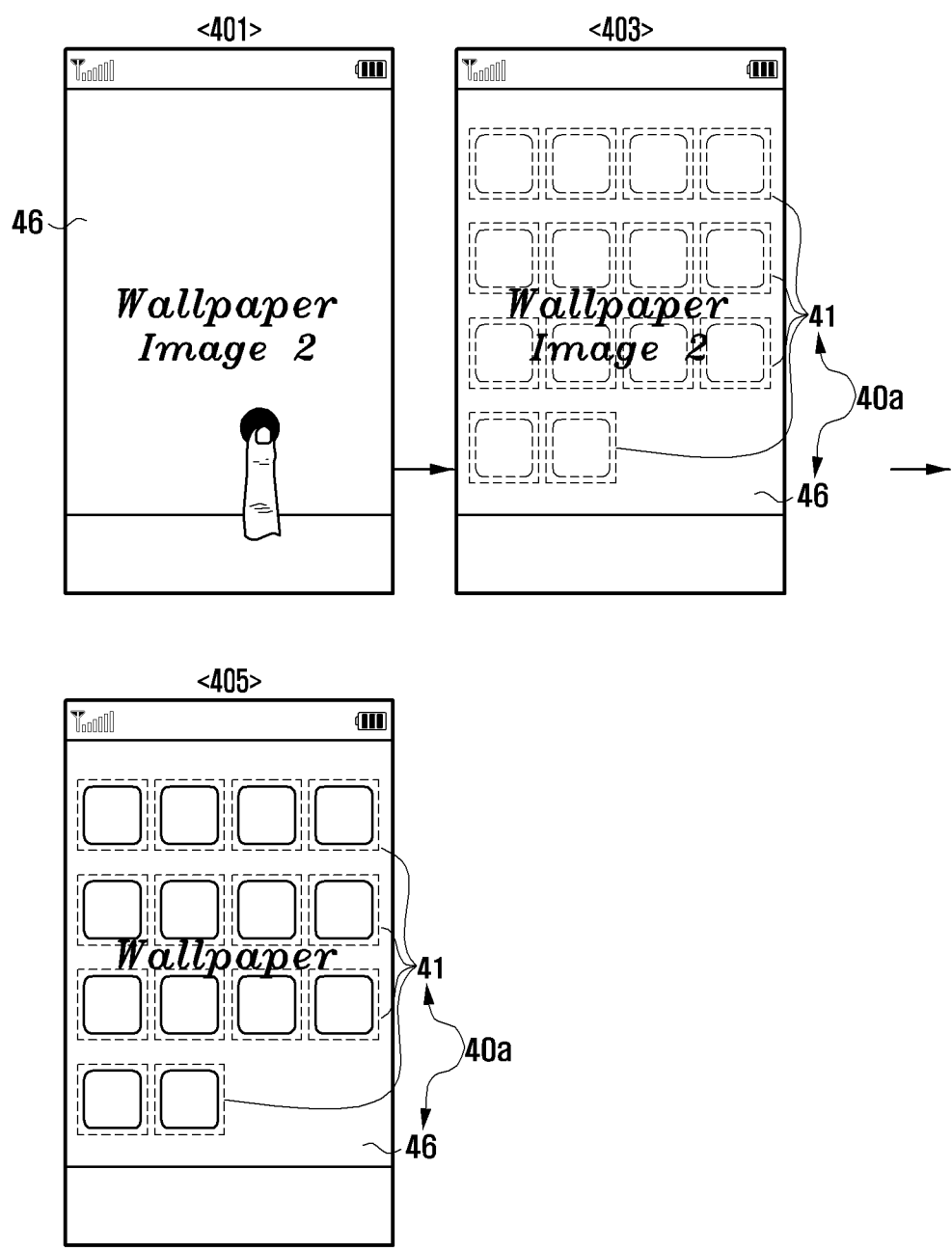
FIG. 4 is a diagram illustrating a user interface associated with an output of a start screen comprising a complex area according to an embodiment of the present invention.

FIG. 4 illustrates an example screen that recalls a removed function selection area according to a background content operating function according to an embodiment of the present invention.

Referring to FIG. 4, the user searches for various background content registered in the background content list 153 according to generation of an input signal. Here, when the second background screen 46 is being outputted to the touch screen 140, the user generates an input signal for calling the function selection area 41. Namely, as shown in a screen 401, when the second background screen 46 is being outputted, the user generates the input signal for recalling the function selection area 41.

Then, the controller 160 calls the function selection area 41 to be outputted to the touch screen 140, as shown in a screen 405 via a screen 403. The controller 160 controls to output the function selection area 41 on the second background screen 46 previously outputted such that a second start screen 40a that is different from the first start screen 40 is outputted to the touch screen 140. The second start screen 40a is the same function selection area 41 but the background content is configured differently from the first start screen 40. Thus, the controller 160 can change setting of the start content in the background content list 153. That is, when the first background content is set as the start content in the background content list 153 such that the first background content is outputted to the first start screen 40 in the screen 301, the controller 160 controls to change the start content to the second background content according to forming the second start screen 40a. Accordingly, when a situation for outputting the start screen subsequently occurs, the controller 160 controls to output the second start screen 40a based on the second background content to the touch screen 140.

The screen 403 is an example effective screen in which the function selection area 41 is outputted to the second background screen 46 and shows an intermediate screen with a fade in effect, i.e., an object becomes gradually vivid on the second background screen 46 from which the function selection area 41 is removed. As described above, such effective screen is replaced by another effective screen by, for example, a method in which the function selection area 41 is moved from an edge toward a center.

Figure 5:
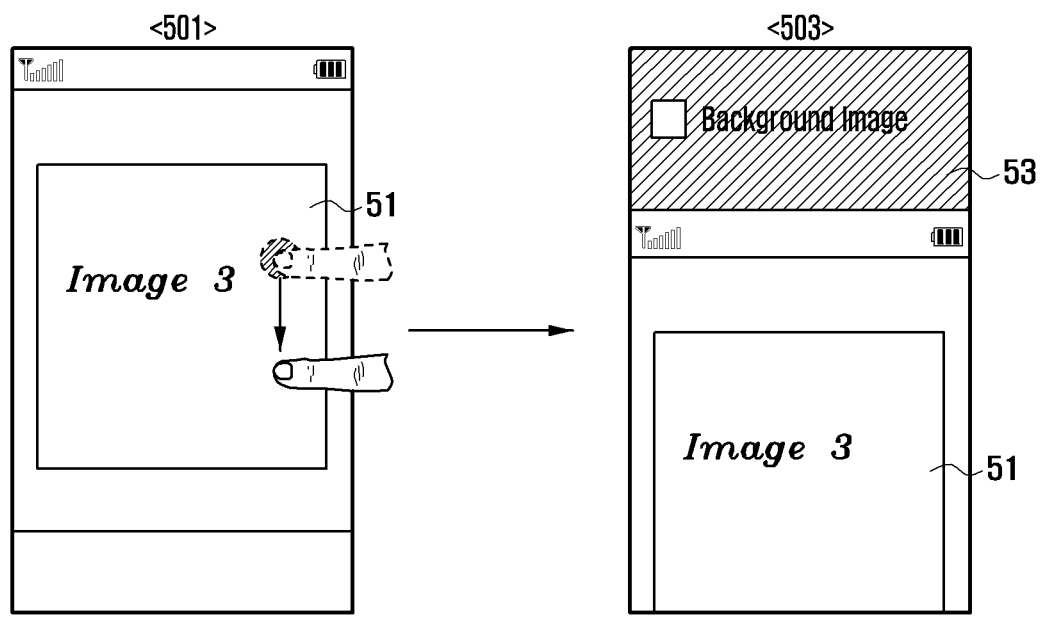
FIG. 5 is a diagram illustrating an example screen illustrating registration of a background content of the present invention.

FIG. 5 is a diagram illustrating a screen interface for registering a background content to a background content list according to an embodiment of the present invention.

Referring to FIG. 5, a user selects a specific menu from various menus outputted to the function selection area 41 and views a specific image or a text screen according to an operation of a user function provided by a corresponding menu. When the user wants to operate a screen comprising a specific image or text screen as the background screen, the user generates an input signal for registering a corresponding content 51 as the background content in a screen in which the corresponding content 51 is outputted, as shown in a screen 501. For example, the user generates a touch event for controlling to drag and move a screen output to the touch screen 140 in a predetermined direction.

Then the touch screen 140 outputs an item for setting the background content in a blank area 53 formed by moving the screen in which the specific content 51 is outputted, as shown in screen 503, according to a touch event. Thus, the user performs an operation while maintaining the touch event for moving the specific content 51, e.g., the touch-down. When the touchdown is released, the controller 160 controls the screen in which the specific content 51 is outputted to return to the screen 501. The user selects a background content setting item outputted to the blank area 53 to designate a corresponding specific content 51 as the background content. When the input signal for selecting the background content setting item is generated, the controller 160 controls to update the background content list 153 stored in the storage unit 150. Accordingly, when a background content search is performed subsequently, the touch screen 140 supports to search for a background content that is newly added according to an input signal for searching.

FIG. 6 is a diagram illustrating a screen interface related to cancellation of a background content registered in a background content list according to an embodiment of the present invention.

Referring to FIG. 6, according to the user's request, the terminal 100 outputs a background screen comprising a specific background content, for example, a second background content 61, as shown in a screen 601. The user performs to generate the input signal for removing the function selection area in the start screen in which the function selection area and the background content area are outputted together. According to generation of a corresponding input signal, the background screen comprising only the background content is outputted to the touch screen 140. Thus, the user generates not only an input signal for searching for the background content but also an input signal for removing a specific background content 61 from the background content list 153. That is, as illustrated in FIG. 6, when the background content 61 to be removed from the background content list 153 is outputted to the touch screen 140, the user generates an input signal for removing the corresponding background content 61, e.g., perform a touch operation to drag the background content screen in a certain direction.

Then, the controller 160 supports to output a setting item to be removed or cancelled from the corresponding background content list 153 to a blank area 63 that is generated according to moving a screen of the background content 61. The user selects a corresponding setting item to instruct removal of the background content 61, which is currently outputted, from the background content list 153. When an input signal for cancelling the background content 61 is generated, the controller 160 can update the background content list 153 according to removing the background content 61, which is currently outputted from the background content list 153. Additionally, the controller 160 controls removal of the background content 61, which is currently outputted, from the touch screen 140 and to automatically output other background content, which is registered in the background content list 153, to the touch screen 140. Here, if there exists no other background content registered in the background content list 153, the controller 160 controls to output a screen having no background content, e.g., a screen displaying a single color only. Alternatively, when there exists no other background content, the controller 160 controls to prevent a current background content from being removed and to output a message indicating that there exists no background content other than a corresponding background content FIG. 7 is a diagram illustrating an example of a background content list screen according to an embodiment of the present invention.

Figure 7:
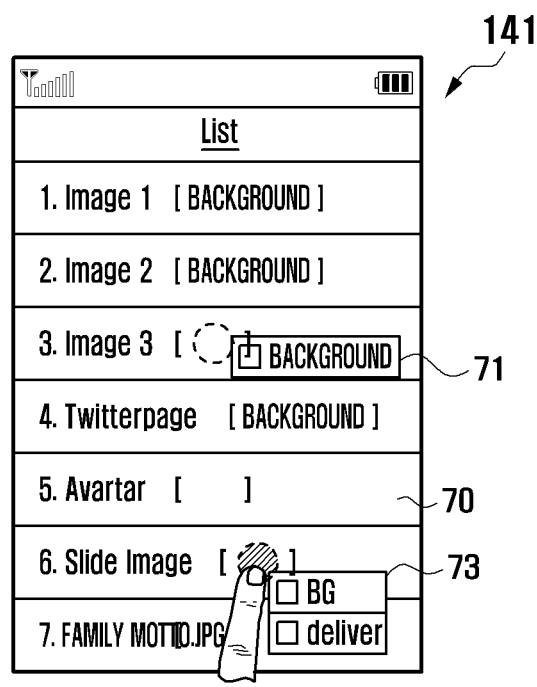
FIG. 7 is a diagram illustrating an example screen illustrating a list screen including a background content list and a corresponding function.

Referring to FIG. 7, the user searches for a background content list screen through selecting a specific menu item. The controller 160 provides a menu item for searching for the background content list 153. Also, when a corresponding menu item is selected, the controller 160 controls to identify the background content list 153 stored in the storage unit 150 and to output a list screen comprising items included in the corresponding background content list 153 to the touch screen 140. Thus, the controller 160 supports to output the background content list 153 as well as various content that can be used as the background content list 153 to a corresponding list screen. That is, when outputting the list screen related to the background content list, the controller 160 supports to output the list screen including a specific content and at least one background content.

Also, the controller 160 performs indexing for distinguishing items designated as the background content from items not designated as the background content. For example, the controller 160 adds an index "[background]" with respect to content registered as the background content list, as illustrated in FIG. 7. Also, the controller 160 adds an index "[ ]" for content not designated as the background content.

The user performs to designate a corresponding content as the background content by selecting the index "[ ]". That is, the user performs a touch operation on the touch panel area 143 corresponding to the index "[ ]" to designate the content not designated as the background content as the background content. Then the controller 160 outputs a popup window 71 including an item for designating a corresponding content as the background content. The user designates a content not designated as the background content as the background content by selecting an item included in the popup window 71.

Also, the user designates a specific content designated as the background content as the start content outputted to the start screen by using the background content list screen. For example, the user performs an operation that generates the touch event selecting the above described the index "[background]". Then, the controller 160 outputs an auxiliary window 73 for designating a corresponding background content as the start content in an area adjacent to an area to which a corresponding content is outputted according to generation of a corresponding touch event. The user designates a specific background content as the start content by using a start content designating item BG included in the auxiliary window 73. Namely, when selecting a specific background content in the list screen, the controller 160 of the present invention 160 supports to output at least one of an item for removing a corresponding background content from the list of the background content and an item for setting a corresponding background content as the start content to be outputted to the background content area of a complex area. Additionally, the user supports to transmit a corresponding content to a specific terminal by using a content delivery item DELIVER added to the auxiliary window 73.

The background content according to an embodiment of the present invention includes a still image as well as various content such as, for example, a video content, a slide content, or an avatar content. In FIG. 7, a reference number 70 is used to indicate that the avatar content can be included in the background content. The avatar content identified by the reference number 70 can be replaced by, for example, the video content.

Figure 8:
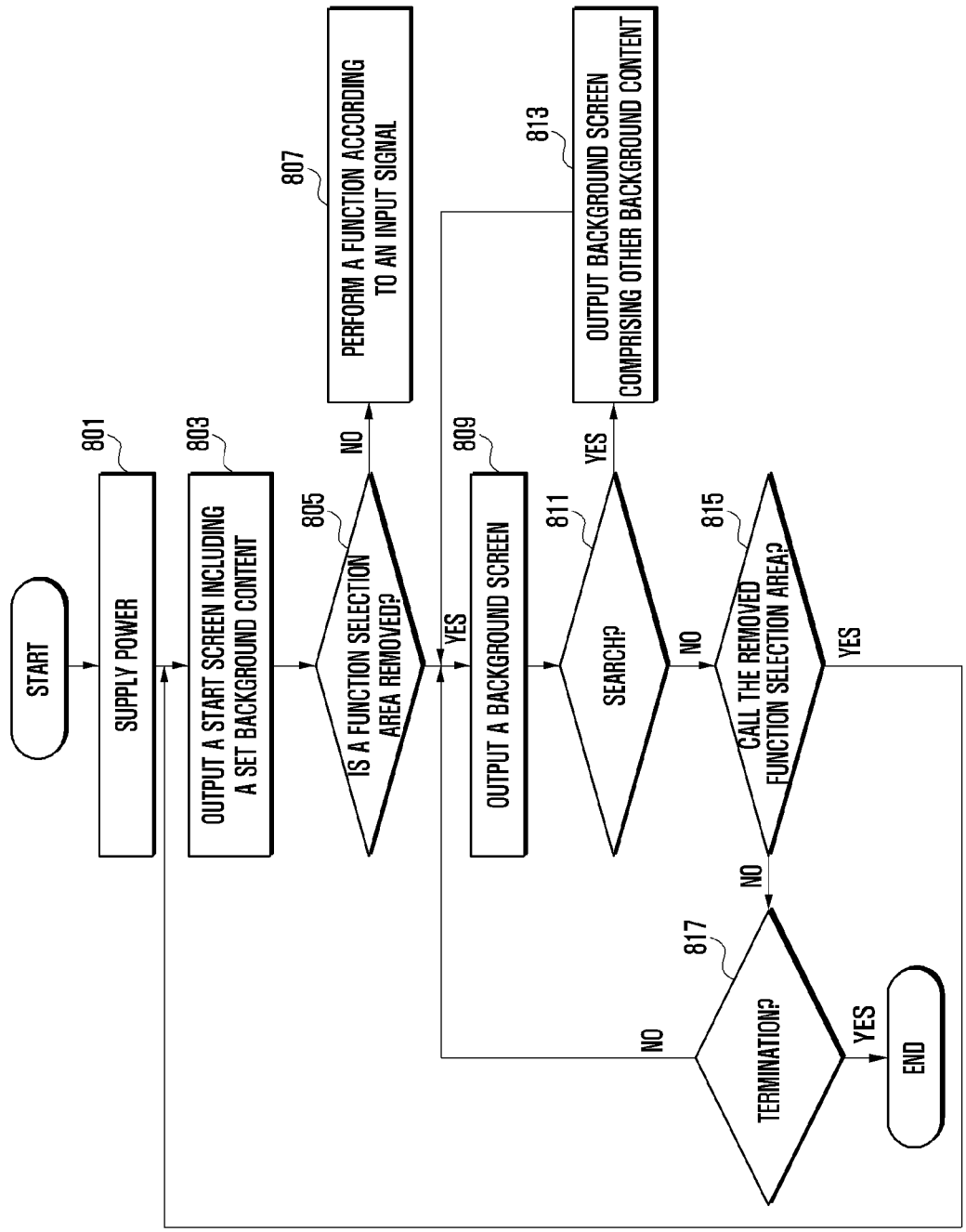
FIG. 8 is a flow chart illustrating a method of operating background content according to an embodiment of the present invention.

FIG. 8 is a diagram illustrating a method of operating a terminal for operating a background content according to an embodiment of the present invention.

Referring to FIG. 8, in the method of operating the terminal according to the present invention, first, the controller 160 provides a power necessary for operating each element of the terminal 100 by using a supplied power (801).

Next, the controller 160 supports to output the start screen including a set background content in step 803 corresponding to the start screen output to the touch screen 140. The controller 160 identifies the background content list 153 stored in the storage unit 150 to determine which background content is stored as the start content. When identifying the start content is completed, the controller 160 supports to output the identified start content to the background content area while controlling the preset function selection area on an upper portion of the background content area (803). Here, as described above, the function selection area includes an area in which various menu items, an icon, a widget icon, and the like, for selecting a specific file are disposed according to a preset specification. For example, the function selection area is a menu icon selection screen in which at least one menu icon is disposed, a widget selection screen in which at least one widget icon is disposed, or a file selection screen in which icons corresponding to at least one file are disposed and includes an area in which a screen where various items described above are disposed is outputted.

Next, when a specific input signal is generated from the input unit 120 and the touch screen 140, the controller 160 determines whether a corresponding input signal is the input signal for removing the function selection area (805). Thus, when the corresponding input signal is not the input signal for removing the function selection area, the controller 160 supports performing a function corresponding to the input signal (807). For example, when a corresponding input signal is an input signal for selecting an icon related to a specific user function outputted to the function selection area, the controller 160 supports to execute a user function corresponding to the selected icon.

When a corresponding input signal is the input signal for removing the function selection area in step 805, the controller 160 removes the function selection area and support to output the background screen comprising only the background content area, disposed below the function selection area, to the display panel 141 (809).

Next, when an additional input signal is generated, the controller 160 determines whether a corresponding input signal is an input signal for searching for other background content. Here, when the corresponding input signal is the input signal for searching for other background content area, the controller 160 supports to output other background content to the display panel 141 according to the corresponding input signal (813), and the controller 160 returns to step 809.

If the corresponding input signal is not an input signal for searching (811), the controller 160 determines whether the corresponding input signal is the input signal for recalling the removed function selection area (815). If the corresponding input signal is the input signal for recalling the removed function selection area at step 815, the controller 160 controls to fix the background content, currently outputted to the display panel 141 according to a search, to the background content area and output the function selection area to the fixed background content area (803). Here, if the corresponding input signal is not the input signal for recalling the removed function selection area, the controller 160 determines whether the input signal is an input signal for termination (817), and if the input signal is not a separate input signal for termination, the controller 160 performs subsequent steps again (809).

As described above, in a method of operating the background content and a terminal supporting the same according to an embodiment of the present invention, the function selection area is removed such that the background content outputted with the function selection area is fully searched. Also, the present invention supports to enable searching for other background content registered in the background content list 153 according to the user's request, easily registering certain content as a background content, and removing the registered background content.

Although in the above description, the start screen is defined as a screen in which the background content area and the function selection area are outputted together, alternatively, if there exist an area, in which the background content is provided according to a specific user function, and the function selection area outputted to an area in which a corresponding background content is provided, a function of outputting the background screen comprising only the background content area applies according to generation of the input signal for removing the function selection area of the present invention. Accordingly, the start screen is replaced by a specific user function screen comprising the background content area and the function selection area. The background content outputted to the background content area and a user function selected in the function selection area are configured independently to each other.

The mobile 100, according to the form in which the mobile 100 is provided, may further include an additional element such as a short range communication module for short range communication, an interface for transmitting and receiving a data according to a wired communication method or a wireless communication method of the terminal 100, an internet communication module for performing an internet function by communicating with an internet network, and a digital broadcast module for performing to receive and reproduce a digital broadcast content.

Further, the terminal 100 according to an embodiment of the present invention provides any types of devices that provide the start screen in which the function selection area is outputted on the background content. For example, the terminal 100 includes all information technology devices, multimedia devices, and their associated application devices, such as a Portable Multimedia Player (PMP), a digital broadcasting player, a Personal Digital Assistant (PDA), a music reproducing device (for example, an MP3 player), a mobile game terminal, a smart phone, a lap top, and a handheld PC, including all mobile communication terminals operating based on communication protocols corresponding to various communication systems, just to name a few possibilities.

In a method of operating the background content and a terminal supporting the same according to an embodiment of the present invention, the function selection area including various icons or images required for operating a user function is temporarily removed according to a user's request such that a content provided to the background content area is easily and promptly viewed while supporting to easily return to the function selection area.

Although various embodiments of the present invention have been described in detail herein, it will be apparent to those skilled in the art that various changes may be made without departing from the spirit and scope of the present invention, as defined in the appended claims.

What is claimed is:

1. A method for displaying a background content of a mobile electronic device comprising a touch screen display that includes a display panel configured to display a screen and a touch panel configured to receive touch inputs on the screen, the method comprising:
   providing, for displaying on the screen, a first layer which includes a background content and does not include an item for executing an application on the mobile electronic device based on a selection of the item;
   providing, for displaying, over the first layer, one or more layers including a second layer which includes an item for executing an application on the mobile electronic device based on a selection of the item; and
   in response to receiving a touch input on the screen via the touch panel, removing the second layer displayed over the first layer in such a way that no additional layer other than the one or more layers is provided for displaying over the first layer in relation to the touch input.

2. The method of claim 1, wherein the second layer is removed so that no item corresponding to an application executable on the mobile electronic device is displayed over which the second layer occupied before being removed.

3. The method of claim 1, further comprising:
   receiving an input on the touch screen for searching for other background content; and
   providing a first layer on which to display the other background content according to the input for searching for the other background content.

4. The method of claim 3, wherein providing a first layer on which to display the other background content comprises:
   identifying a list of background content when the input for searching the other background content is generated;
   selecting the other background content based on the identified list of background content and the generated input; and
   providing the first layer on which to display the selected other background content.

5. The method of claim 4, wherein the background content comprises at least one of:
   at least one of a still image, a video, an avatar, or a slide image; and
   an audio file associated with at least one of the still image, the video, the avatar, or the slide image, and activated when a corresponding background content is outputted.

6. The method of claim 3, further comprising:
receiving an input for recalling the removed second layer; and
outputting again the one or more layers including the second layer over the first layer.

7. The method of claim 1, further comprising at least one of:
outputting a specific content;
outputting a setting item for designating the specific content as a background content according to generation of an input and registering the specific content to a list of background content, when the setting item for designating the specific content as the background content is selected; and
outputting a setting item for removing the background content from the list of the background content according to generation of an input when the background content is being outputted and removing the background content from the list of the background content according to selection of the setting item.

8. The method of claim 1, wherein removing the second layer comprises:
fading away a first portion of the second layer to a first direction; and
fading away a second portion different from the first portion of the second layer to a second direction opposite to the first direction.

9. The method of claim 1, further comprising:
receiving corresponding update information from an external device according to at least one of a predetermined interval, real time, or an event occurring, when the background content provided in the first layer is a content having an update function according to update information; and
updating a content of the background content to be output by applying the received update information to a corresponding background content.

10. A non-transitory computer-readable storage medium encoded with instructions that, when executed, cause a mobile electronic device to execute the method of claim 1.

11. A mobile electronic device for displaying a background content, the mobile electronic device comprising:
a touch screen display that includes a display panel configured to display a screen and a touch panel configured to receive touch inputs on the screen; and
a processor configured to:
control to provide, for displaying on the screen, a first layer which includes a background content and does not include an item for executing an application on the mobile electronic device based on a selection of the item, control to provide, for displaying over the first layer, one or more layers including a second layer which includes an item for executing an application on the mobile electronic device based on a selection of the item; and
in response to receiving a touch input on the screen via the touch panel, control to remove the second layer displayed over the first layer in such a way that no additional layer other than the one or more layers is provided for displaying over the first layer in relation to the touch input.

12. The mobile electronic device of claim 11, wherein, when the second layer is removed and an input for searching for other background content is received, the processor controls to provide a first layer on which to display other background content to the touch screen according to the input for searching for other background content.

13. The mobile electronic device of claim 12, wherein the processor controls to identify a list of background content when the input for searching for other background content is generated, select the other background content based on the identified list of background content and the generated input, and provide the first layer on which to display the selected other background content.

14. The mobile electronic device of claim 12, wherein, in response to receiving an input for calling the removed second layer, the touch screen outputs again the one or more layers including the second layer over the first layer.

15. The mobile electronic device of claim 11, wherein the second layer is removed by a first portion of the second layer fading away to a first direction and a second portion different from the first portion of the second layer fading away to a second direction opposite to the first direction.

16. The mobile electronic device of claim 11, wherein the processor receives corresponding update information from an external device according to at least one of a predetermined interval, real time, or an event occurring, when the background content provided in the first layer is a content having an update function according to update information and updates a content of the background content to be output by applying the received update information to a corresponding background content.

17. The mobile electronic device of claim 11, wherein the background content comprises at least one of:
at least one of a still image, a video, an avatar, or a slide image; and
an audio file associated with at least one of the still image, the video, the avatar, or the slide image, and activated when a corresponding background content is outputted.

18. The mobile electronic device of claim 11, wherein the second layer is removed so that no item corresponding to an application executable on the mobile electronic device is displayed over which the second layer occupied before being removed.

* * * * *